United States Patent [19]

Poehlman

[11] 4,053,980
[45] Oct. 18, 1977

[54] CHAIN SAW INCLUDING AN OVERTORQUE RELEASING CLUTCH

[75] Inventor: Arthur G. Poehlman, West Bend, Wis.

[73] Assignee: Outboard Marine Corporation, Waukegan, Ill.

[21] Appl. No.: 723,819

[22] Filed: Sept. 16, 1976

[51] Int. Cl.² .................... B23D 57/02; F16D 23/00
[52] U.S. Cl. .................................... 30/381; 64/29; 192/56 R; 192/89 B
[58] Field of Search ............... 30/381, 383; 64/29; 192/56 R, 89 B

[56] References Cited

U.S. PATENT DOCUMENTS

| | | | |
|---|---|---|---|
| 3,144,890 | 8/1964 | Irgens | 30/383 |
| 3,339,596 | 9/1967 | Deelman | 30/383 |
| 3,499,512 | 3/1970 | Maurice | 192/89 B |
| 3,519,037 | 7/1970 | Linkfield | 83/821 |
| 3,596,446 | 8/1971 | Bryan | 64/29 X |
| 3,967,711 | 7/1976 | Stroezel et al. | 64/29 X |

Primary Examiner—James L. Jones, Jr.
Assistant Examiner—James G. Smith
Attorney, Agent, or Firm—Michael, Best & Friedrich

[57] ABSTRACT

Disclosed herein is a chain saw including a drive shaft, a chain sprocket and a clutch including a drive member driven by the drive shaft and a driven member for rotating the chain sprocket in response to rotation of the drive shaft. One of the members is axially movable relative to the other between an engaged or driving position and a released position wherein they are disengaged from each other. The drive and driven members have intermeshing clutch teeth which coact to produce an axial force in a direction tending to separate the axially movable one of the members from the other. The members are releasably held in the driving position by a resilient element which is movable between a first position wherein it yieldably resists axial displacement of the axially movable one of the members and a second position which is spaced from the first position so as to permit movement of the axially movable one of the members to the released position. The resilient element is moved from the first position to the second position when the axially directed separating force exceeds a predetermined level and remains in the second position in absence of a reset force being applied thereto in an axial direction opposite to the separating force.

14 Claims, 10 Drawing Figures

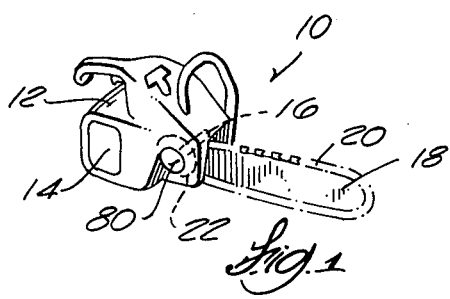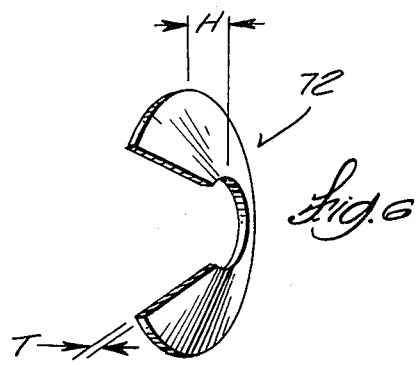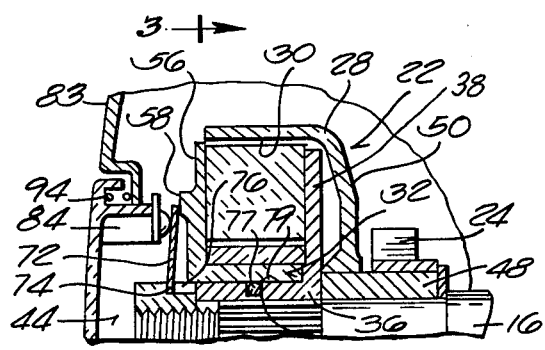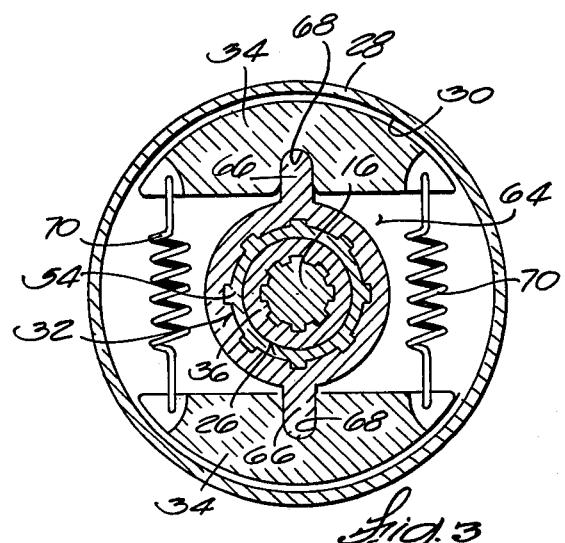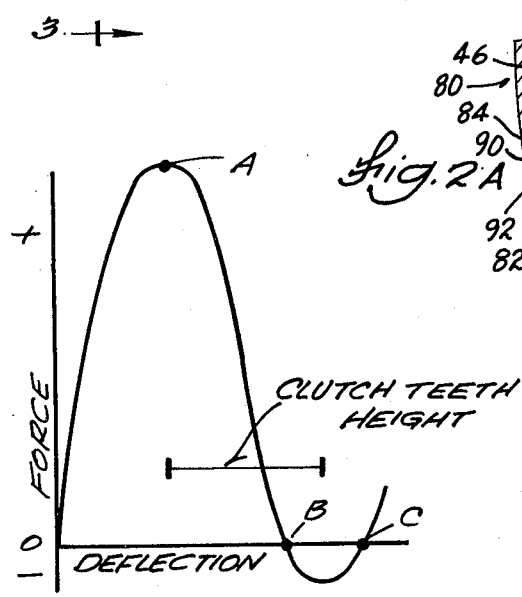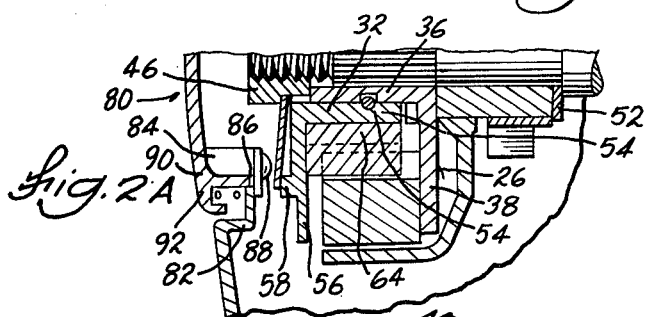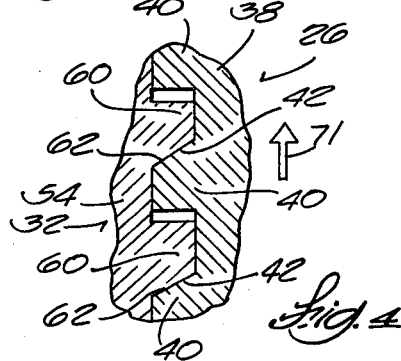

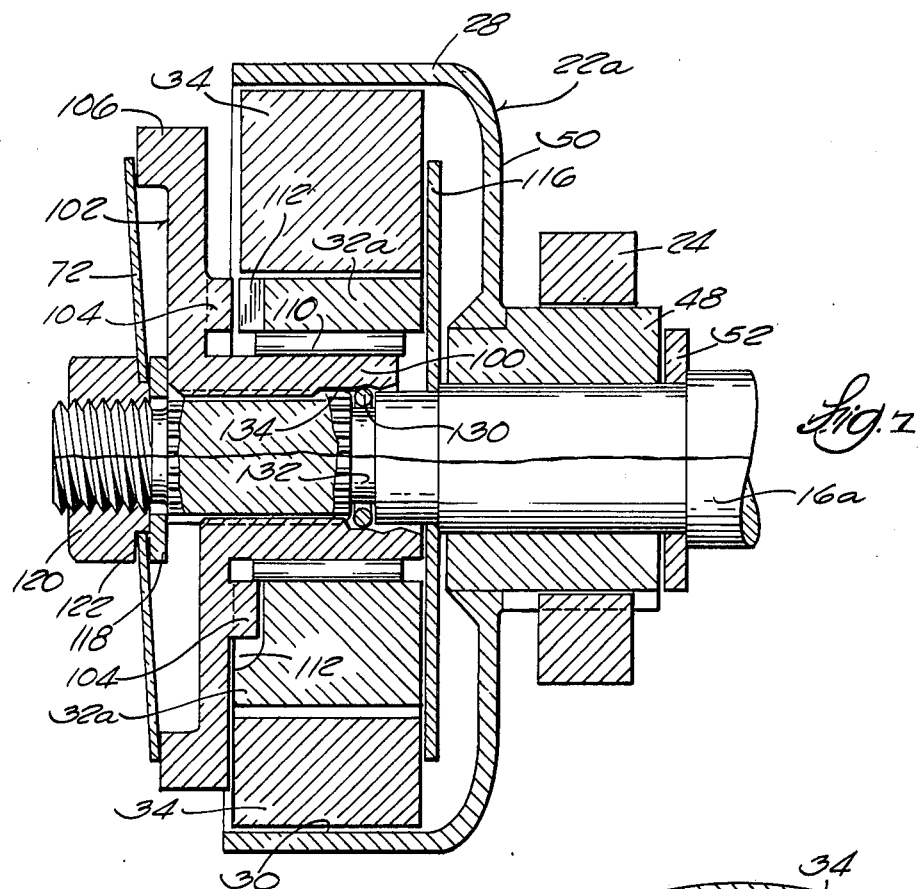
Fig. 7
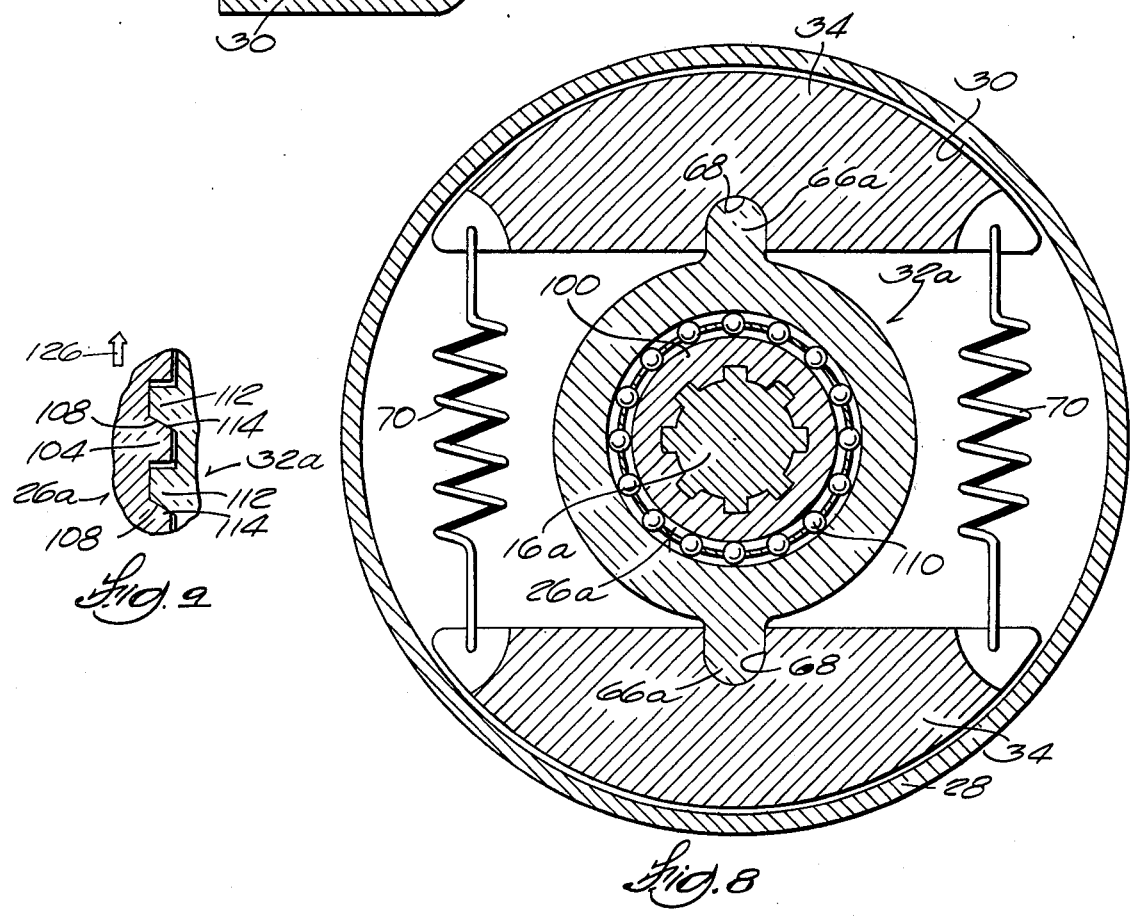
Fig. 9
Fig. 8

CHAIN SAW INCLUDING AN OVERTORQUE RELEASING CLUTCH

BACKGROUND OF THE INVENTION

The invention relates to chain saws and more particularly to clutches for chain saws.

It is common practice to drive the saw chain of a chain saw by an engine through a centrifugal clutch which operates in response to rotation above a predetermined speed to drivingly connect a chain drive sprocket to the engine. Such clutches are often arranged to permit some slippage in the event the saw chain becomes squeezed in the kerf or otherwise is restrained from movement. This restraining force on the chain frequently can be greater than the force transmitted from the engine to the chain and can result in damage to the chain, the engine or intervening components. Such forces develop so rapidly that conventional centrifugal clutches often cannot react or disengage rapidly enough to avoid damage to the chain saw.

Representative examples of prior chain saw centrifugal clutch constructions are disclosed in the following U.S. Pat. Nos.:

Kiekhaefer: 2,675,835 issued Apr. 20, 1954
Irgens: 3,144,890 issued Aug. 18, 1964
Deelman: 3,339,596 issued Sept. 5, 1967
Linkfield: 3,519,037 issued July 7, 1970
Mattsson: 3,664,390 issued May 23, 1972
Densow: 3,818,533 issued Mar. 14, 1974
Arff: 3,849,884 issued Nov. 26, 1974.

Attention is also directed to the following U.S. Pat. Nos.:

Connell: 2,728,252 issued Dec. 27, 1955
Amtsberg: 2,881,888 issued Apr. 14, 1959
Lill: 3,035,675 issued May 22, 1962
Paterson et al: 3,435,931 issued Apr. 1, 1969.

SUMMARY OF THE INVENTION

The invention provides a chain saw having a clutch assembly which includes means for completely and rapidly releasing driving engagement of the clutch in the event the saw chain engages an obstruction causing a substantial increase on the resistance to chain movement.

More particularly, the invention provides a chain saw including a frame, an engine mounted on the frame, a drive shaft rotatably mounted on the frame and driven by the engine, a chain sprocket mounted for rotation coaxially with the drive shaft, a cutter bar supported by the frame, a saw chain trained around the sprocket and the cutter bar, and a clutch including a drive member for common rotation with the drive shaft and having one or more clutch teeth, a driven member having one or more clutch teeth adapted to be drivingly engaged by the drive member clutch teeth, and means for drivingly connecting the driven member to the sprocket in response to rotation of the drive shaft. One of the drive and driven members is mounted for axial movement relative to the other between a released position wherein the drive and driven members are disengaged and a driving position wherein the drive and driven members are in driving engagement to afford transmission of torque therebetween with the clutch teeth coacting to produce a separating force directed axially in one direction and tending to axially displace the axially movable one of the members toward the released position. The engine also includes a resilient element which interacts with the driven member and is movable between a first position wherein it yieldably resists axial displacement of the axially movable one of the drive and driven members toward the released position and a second position which is spaced from the first position so as to permit movement of the axially movable one of the drive and driven members to the released position. The resilient element moves from the first position to the second position when the axially directed separating force exceeds a predetermined level and remains in the second position in the absence of a reset force applied in an axial direction opposite to the direction of the separating force.

In one embodiment, the driven member is mounted for axial movement relative to the drive member and the resilient element is mounted to yieldably resist axial displacement of the driven member toward the released position.

In another embodiment, the drive member is mounted for axial movement relative to the driven member and the resilient element is mounted to yieldably resist axial displacement of the drive member relative to the driven member.

The resilient element preferably is a Belleville spring including an outer peripheral portion having an inner surface bearing against the axially movable one of the drive and driven members.

In further accordance with an embodiment of the invention, there is provided a reset means which is selectively operable for moving the resilient element to the first position and for thereby returning the separated one of the drive and driven members from the released position to the driving position.

One of the principal features of the invention is the provision of a chain saw including a clutch incorporating an overtorque release means.

Another of the principal features of the invention is the provision of a chain saw including a centrifugal clutch incorporating a release means which is arranged to completely and rapidly disengage the saw chain from the engine in the event the saw chain encounters an obstruction causing an overload condition.

Still another of the principal features of the invention is the provision of a chain saw centrifugal clutch including a simplified overtorque release means which can be conveniently actuated for return to a drive position after release.

Other features and advantages of the embodiments of the invention will become apparent upon reviewing the following detailed description, the drawing and the appended claims.

BRIEF DESCRIPTION OF THE DRAWING

FIG. 1 is a perspective view of a chain saw incorporating various of the features of the invention.

FIG. 2 is an enlarged, fragmentary, end elevational view, partially in section, of the clutch employed in the chain saw shown in FIG. 1 illustrating the position of the components when the clutch is in a driving position of the components when the clutch is in a released position.

FIG. 2A is an enlarged, fragmentary, and elevational view partially in section, of the clutch employed in the chain saw shown in FIG. 1, illustrating the position of the components when the clutch is in a released position.

FIG. 3 is a sectional view taken along the lines 3—3 in FIG. 2.

FIG. 4 is an enlarged fragmentary view of the drive member and the driven member of the clutch shown in FIG. 2 with these members shown in a driving position.

FIG. 5 is a graph illustrating the force-deflection characteristics of the Belleville spring employed in the clutch shown in FIG. 2.

FIG. 6 is a perspective view, partially sectioned, of the Belleville spring employed in the clutch shown in FIG. 2.

FIG. 7 is an enlarged, fragmentary, split, end elevational view, partially in section, similar to FIG. 1 illustrating an alternate construction for the clutch. The lower half of FIG. 7 shows the position of the components when the clutch is in a driving position and the upper half shows the position of the components when the clutch is in a released position.

FIG. 8 is a sectional view taken along the lines 8—8 in FIG. 7.

FIG. 9 is an enlarged fragmentary view of the drive member and the driven member of the clutch shown in FIG. 7 with these members in a driving position.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Illustrated in the drawings is a chain saw 10 including a frame 12 supporting an engine 14 drivingly connected to a rotatable drive shaft 16, together with a cutter bar 18 around which a saw chain 20 is guided for travel. The drive shaft 16 can either be the engine output shaft or another shaft driven by the engine output shaft. Power is transmitted from the engine 14 to the chain saw 20 through a centrifugal clutch 22 and a chain sprocket 24 (FIG. 2) driven by the clutch 22 and rotatably mounted on the drive shaft 16.

In the construction illustrated in FIGS. 1-6, the clutch 22 includes a drive element or member 26 which is suitably mounted on the drive shaft 16 for common rotation therewith and a clutch drum 28 which is drivingly connected to the chain sprocket 24. The clutch drum 28 has a cylindrical inner surface 30, and is suitably mounted on the drive shaft 16 for rotation coaxially with and independently of the drive member 26. The clutch 22 also includes a driven element or member 32 which is suitably mounted for rotation coaxially with the drive shaft 16 and for axial movement relative to the drive member 26.

The clutch 22 further includes two or more clutch shoes 34 suitably carried by drive means for rotating the clutch shoes 34 in response to rotation of the driven member 32 and for guiding the clutch shoes 34 relative to the driven member 32 between an inner or retracted position spaced from the clutch drum 28 and an outer or extended position in driving engagement with the clutch drum inner surface 30.

While various arrangements can be used, in the specific construction illustrated, the drive member 26 includes a hub 36 which is bored and splined to facilitate mounting on and common rotation with the drive shaft 16 (FIGS. 2 and 3). Extending radially from the end of the drive member hub 36 closest to the chain sprocket 24 is a disc portion 38 (FIG. 2) having one or more circumferentially-spaced clutch teeth 40 located on the outer face thereof adjacent the drive member hub 36. Each of the drive member clutch teeth 40 has an inclined camming surface 42 (FIG. 4) which serves as a driving surface as described below. The drive member 26 is retained on the drive shaft 16 by a retainer nut 44 threaded onto the outer end of the drive shaft 16 and having a head 46 (FIG. 2).

The clutch drum 28 includes a hub 48 having a bore adapted to be journaled on a portion of the drive shaft 16 adjacent the drive member 26 and a cup including the inner surface 30 and a radially extending flange 50 supported by the clutch drum hub 48. The outer surface of the clutch drum hub 48 is splined for drivingly receiving the chain sprocket 24 which is retained on the clutch drum hub 48 by a thrust washer 52.

The driven member 32 includes a hub 54 having a bore adapted to be journaled on the outer surface of the drive member hub 36, a disc portion 56 which extends radially outwardly from the end of the hub 54 located furthest away from the chain sprocket 24 and which has an annular protuberance 58 and one or more circumferentially-spaced clutch teeth 60 formed on the inner end of the hub 54 closest to the chain sprocket 24. Each of the driven member clutch teeth 60 has an inclined camming surface 62 adapted to match and be drivingly engaged by the camming surface 42 of a corresponding one of the drive member clutch teeth 40 (FIG. 4).

The driven member 32 is axially movable relative to the drive member 26 between a driving position where the camming surfaces 62 of the driven member clutch teeth 60 are drivingly engaged by the camming surfaces 42 of the drive member clutch teeth 40 (as shown in the upper half of FIG. 2) and a released position where the driven member clutch teeth 60 are axially spaced from or disengaged from the drive member clutch teeth 40 (as shown in the lower half of FIG. 2).

Mounted on the hub 54 of the driven member 32 for common rotation therewith is a clutch shoe driver 64 which, in response to rotation of the driven member 32, is adapted to rotate the clutch shoes 34 and to guide the clutch shoes 34 for movement between the retracted and extended positions. While various arrangements can be used, in the specific construction illustrated, the clutch shoe driver 64 includes a bore having internal splines which receive external splines provided on the outer surface of the driven member hub 54 (FIG. 3). The clutch shoe driver 64 also includes a pair of diametrically opposed, radially extending ribs 66, each of which is slidably received in a respective recess 68 provided in the clutch shoes 34 for radial movement of the clutch shoes 34 relative to the clutch shoe driver 64 and for axial movement of the clutch shoe driver 64 relative to the clutch shoes 34. Thus, the rib 66 serves to rotate the clutch shoes 34 and guide them between the retracted and extended positions in response to rotation of the clutch shoe driver 64. Instead of providing a separate clutch shoe driver 64, the driven member 32 can be arranged to serve this function if desired.

The clutch shoes 34 can be constructed in any suitable manner including an arcuate surface adapted to drivingly engage the inner surface 30 of the clutch drum 28 when the clutch shoe driver 64 is rotated above a predetermined speed. Outward movement of the clutch shoes 34 from their retracted position, in absence of rotation of the clutch driver 64 above the predetermined speed, is restrained by a pair of helical springs 70 which extend on the opposite sides of the rotation axis of the clutch shoe driver 64 and which, at their opposite ends, are connected to the clutch shoes 34 and normally urge the clutch shoes 34 towards each other.

In operation, the clutch shoe driver 64 is rotated, via the drive member 26 and the driven member 32, in response to rotation of the drive shaft 16 and such rotation is imparted to the clutch shoes 34 by the clutch driver ribs 66. When the rate of rotation of the clutch shoe driver 64 exceeds the predetermined speed, the clutch shoes 34 move radially outwardly against the biasing force of the springs 70 and drivingly engage the inner surface 30 of the clutch drum 24 to transmit torque to the chain sprocket 24 and, thus, to the saw chain 20. When the rate of rotation of the clutch driver 64 falls below the predetermined speed, such as during idling, the springs 70 return the clutch shoes 34 to their retracted positions and transmission of torque to the chain sprocket 24 is discontinued.

During normal operation, the drive member 26 and the driven member 32 rotate together in the direction of the arrow 71 in FIG. 4 via the matching camming surfaces 42 and 62 of the respective clutch teeth 40 and 60. When a resistive torque load is applied on the driven member 32, a camming action is developed between the camming surfaces 42 and 62, producing an axial component of force tending to axially displace or separate the driven member 32 from the drive member 26.

An overtorque release means is provided for releasably resisting this axial displacement or separating movement of the driven member 32 until a predetermined resistive torque load is applied on the driven member 32, such as when the saw chain 20 engages an obstruction causing a substantial increase in the resistance to chain movement, and for thereafter permitting the driven member 32 to move to a disengaged or released position.

More specifically, such overtorque release means includes a resilient element which interacts with the driven member 32 and is arranged to move, in response to the axial force applied thereon by the driven member 32, from a first position where it yieldably resists the separation of the driven member 32 from the drive member 26 until a predetermined resistive torque load is applied on the driven member 32 and a second position which is spaced from the drive position so as to permit movement of the driven member 32 to the disengaged or released position. The resilient element remains in the release position in the absence of the application of a reset force thereon in an axial direction opposite to the direction of the separating force.

While various arrangements can be used, in the specific construction illustrated, the resilient element comprises a Belleville spring 72 carried in a clearance space 74 between the head 46 of the retainer nut 44 and a sleeve 76 carried on the retainer nut 44 with the inner surface of the outer peripheral portion of the Belleville spring 72 bearing against the annular protuberance 58 on the driven member disc portion 56 and the outer surface of the inner peripheral portion of the Belleville spring 72 engaged by the underside of the retainer nut head 46. The clearance space 74 has a sufficient width to permit free deflection of the Belleville spring 72 in the manner to be described.

The Belleville spring 72 is designed to provide force-deflection characteristics such as illustrated in the graph of FIG. 5 wherein the abscissa represents the degree of spring movement or axial deflection (inches) and the ordinate represents the axial force (lbs.) applied on the spring to achieve the corresponding deflection. The force shown is proportional to the torque load (in.-lbs.) applied on the driven member 32.

Referring to FIG. 5, as an axial load is applied on the Belleville spring 72, deflection increases with increasing load until a maximum point "A" is reached. After that point and during continuance of the axial loading, continuing deflection occurs through point "B", at which time the Belleville spring 72 begins to snap over or invert. When the spring is fully inverted, it comes to rest at some point beyond the negative portion of the curve, such as point "C".

The retainer nut 44 preferably is tightened to compress the Belleville spring 72 to a deflection just below point "A" on the graph in FIG. 5. This causes the Belleville spring 72 to apply a predetermined preload on the driven member 32 in an axial direction opposite to the above-described axial component of force tending to separate the driven member 32 from the drive member 26. So long as the separating force remains below this preload, there is no movement of the Belleville spring 72 or relative movement of the driven member 32 and the drive member 26. That is, there is a full engagement between the camming surfaces 42 and 62 of the clutch teeth 40 and 60, enabling the normal transmission of torque between the drive member 26 and the driven member 32 with a minimum wear on the camming surfaces 42 and 62 and the Belleville spring 72.

When a predetermined resistive torque load is transmitted through the driven member 32 and the camming action developed between the camming surfaces 42 and 62 of the clutch teeth 40 and 60 produces an axial component of force greater than the preload, i.e., a force at least as great as at point "A", the force-deflection characteristics of the Belleville spring 72 come into play. That is, application of the predetermined torque load on the driven member 32, also causes application to the Belleville spring of sufficient axial force to overcome the preload and to exceed the force corresponding to point "A", thereby causing the spring to deflect from point "A" to point "C" and thereby permitting movement of the driven member 32 to the released position.

There is little or no relative separating movement between the driven member 32 and the drive member 26 prior to the occurrence of the predetermined torque load on the driven member 32 in view of the application of the preload. The only spring deflection which occurs is that which takes place as a result of the application of the small axial force increment which represents the difference between the force level "A" and the preload force level. The predetermined torque load is determined by the angle of the clutch teeth camming surfaces and the force-deflection characteristics of the particular Belleville spring used.

As the spring deflects from the point A to the point B and is inverted, i.e., deflected to point "C" on the graph of FIG. 5, the driven member 32 is permitted to move to the released position where the driven member clutch teeth 60 are completely disengaged from the drive member clutch teeth 40. This separation occurs very rapidly, e.g., in a fraction of a second, thereby minimizing wear. As illustrated in the graph of FIG. 5, the height of the clutch teeth 40 and 60 is less than the range of deflection from the point "A" to the point "C". Thus, deflection of the spring 72 from the point "A" to the point "C" permits disengagement of the clutch teeth 40 and 60.

The Belleville spring 72 will remain in the inverted position until reset by applying an axial force thereon in a direction opposite to the direction of the axial force separating the driven member 32 from the drive member 26. Thus, the driven member 32 normally will remain in a released position until the Belleville spring 72 is reset. As shown in the graph of FIG. 5, the reverse axial force required to move the Belleville spring 72 back to its original position, i.e., return it from point "C" to point "A" on the graph, is approximately 10% of the force required to move it to an inverted position.

Preferably, means is provided for holding the driven member 32 in released position so that it cannot accidentally move back into engagement with the drive member 26 until the Belleville spring 72 has been reset. While various arrangements can be used, in the specific construction illustrated, such means comprises a detent mechanism including a radially compressible spring 77 which is carried in an annular groove 78 provided in the exterior of the drive member hub 36 and an annular, V-shaped notch 79 provided in the interior of the driven member hub 36 (FIG. 2). When the driven member 32 is in the driving position, the spring 77 is compressed radially inwardly into the groove 78, as shown in the upper half of FIG. 2, permitting axial movement of the driven member 32 relative to the drive member 26. When the driven member 32 is moved to the released position, the notch 79 is aligned with the groove 78 and the spring 77 expands radially outwardly into the notch 79 as shown in the lower half of FIG. 2.

The notch 79 is dimensioned so that a portion of the spring 77 remains in the groove 78 and serves as a detent resisting axial movement of the driven member 32 relative to the drive member 26. The inclined wall of the notch 79 acts as a camming surface for compressing the spring 77 back into the groove 78 so as to permit the driven member 32 to be moved into engagement with the drive member 26 when the Belleville spring 72 is reset.

The Belleville spring 72 can be constructed from various materials, such as steel and a beryllium-copper alloy, capable of providing the force-deflection characteristics described above. As a guide, referring to FIG. 6, the ratio of the free height "H" to the thickness "T" of the Belleville spring 72 generally should be at least 2.85:1 when the spring is constructed from a steel. For best use in the invention, the force required to reset the Belleville spring desirably should be relatively low, e.g., 20 to 30 lbs. To accomplish this, the above ratio preferably should be about 3:1.

A manual reset means preferably is provided for conveniently returning the Belleville spring 72 to its original condition after the clutch has been released. While various arrangements can be used, in the specific construction illustrated, a reset button 80 is mounted in a recess 82 provided in a portion 83 of the frame 12 housing the clutch 22 and located in the vicinity of the Belleville spring 72. The reset button 80 includes a cylindrical plunger 84 slidably extending through an aperture 86 located in the recess 82 and coaxially aligned with the drive shaft 16, an annular actuating surface 88 located on the inner end of the plunger 84 and adapted to engage the outer surface of the Belleville spring 72 near the outer periphery thereof, and a cap 90 covering the outer end of the plunger 84 and having a ledge 92 extending radially outwardly beyond the plunger 84.

The reset button 80 is urged to a normal position where the actuating surface 88 is spaced from the Belleville spring 72 by a compression spring 94 encircling the plunger 84 with one end bearing against the housing recess 82 and the other end bearing against the underside of the cap ledge 92. The Belleville spring 72 is reset by manually depressing the reset button 80 to apply a sufficient axial force on the spring 90 to snap it back to its original position as shown in the upper half of FIG. 2. As the Belleville spring 72 snaps back, it moves the driven member 32 to the driving position. Upon releasing the reset button 80, it is returned by the spring 94 to its normal position where the actuating surface 88 is spaced from the Belleville spring 72 as illustrated in the lower half of FIG. 2.

In the alternate clutch construction illustrated in FIGS. 7-9, wherein components corresponding to those in the construction illustrated in FIGS. 1-6 have been assigned the same reference numerals, the drive member is mounted for axial movement relative to the driven member and the driven member is arranged to also serve as the clutch shoe driver. Otherwise, the clutch 22a operates in the same general manner as the clutch 22 illustrated in FIGS. 1-6.

More specifically, the drive member 26a includes a hub 100 which is bored and splined to facilitate mounting on and common rotation with the drive shaft 16a. Extending radially from the end of the drive member hub 100 furthest away from the chain sprocket 24 is a disc portion 102 having one or more circumferentially-spaced clutch teeth 104 located on the inner face thereof near the hub 100 and an annular protuberance 106 on the outer face thereof. Each of the drive member clutch teeth 104 has an inclined camming surface 108 which serves the same function as the camming surface 42 described above.

The driven member 32a includes a bore adapted to be journaled on the outer surface of the drive member hub 100 via a bearing 110 and one or more circumferentially-faced clutch teeth 112 formed on the end furthest away from the chain sprocket 24. Each of the driven member clutch teeth 112 has an inclined camming surface 114 adapted to match and be drivingly engaged by the camming surface 108 of a corresponding one of the drive member clutch teeth 104 (FIG. 9).

The driven member 32a further includes a pair of diametrically opposed, radially extending ribs 66a which are received in respective recesses 68 provided in the clutch shoes 34 and serve the same function as the ribs 66 of the clutch shoe driver 64 in the construction illustrated in FIGS. 1-6. Thus, the driven member 32a serves the combined functions of the drive member 32 and the clutch shoe driver 64 in the construction illustrated in FIGS. 1-6.

The drive member 26a is axially movable relative to the drive shaft 16a and to the driven member 32a between a driving position where the camming surfaces 108 of the clutch teeth 104 thereof drivingly engage the camming surfaces 114 of the driven member clutch teeth 112 (as shown in the lower half of FIG. 7) and a released position where the drive member clutch teeth 104 is disengaged from the driven member clutch teeth 112 (as shown in the upper half of FIG. 7). The driven member 32a is retained against axial movement by a circular flange 116 carried on the drive shaft 16a adjacent the clutch drum hub 48. Axial movement of the drive member 26a in the direction of separation (i.e., to the left as viewed in FIG. 7) is limited by a washer 118 carried on the drive shaft 16a at a location remotely spaced from the clutch drum hub 48. The washer 118 is retained on the drive shaft 16a by retainer nut 120 threaded onto the outer end of the drive shaft and including an annular recess 122.

During normal operation, the drive member 26a and the driven member 32a rotate together in the direction of the arrow 126 in FIG. 9 via the matching camming surfaces 108 and 114 of the respective clutch teeth 104 and 112. When a resistive torque load is applied on the driven member 32a, an axial component of force tending to separate the drive member 26a from the driven member 32a is produced as described above.

Carried in the annular recess 122 of the retainer nut 120 is a Belleville spring 72 which has the same force-deflecting characteristics as described above and serves to resiliently resist separation of the drive member 26a from the driven member 32a in the same general manner as described above. For this purpose, the inner surface of the outer peripheral portion of the Belleville spring 72 bears against the annular protuberance 106 on the drive member disc portion 102 and the outer surface of the inner peripheral portion of a Belleville spring 72 is engaged by the retainer nut 120 to provide the desired preload.

When an overtorque condition occurs, the clutch 22a operates in the same manner as described above except the drive member, instead of the driven member, is moved to the released position. The drive member 26a is held in the released position until the Belleville spring 72 has been reset by a detent mechanism including a radially compressible spring 130 carried in an annular groove 132 provided in the drive shaft 16a and a notched recess 134 provided in the bore of the drive member 26a. This detent mechanism operates in the same general manner as the detent mechanism described above for the construction illustrated in FIGS. 1-6.

When a reset force is applied to the Belleville spring 72, the drive member is returned to the driving position.

Various of the features of the invention are set forth in the following claims.

What is claimed is:

1. A chain saw comprising a frame, an engine mounted on said frame, a drive shaft rotatably mounted on said frame and driven by said engine, a chain sprocket mounted for rotation coaxially with said drive shaft, a cutter bar supported by said frame, a saw chain trained around said sprocket and said cutter bar, a clutch including a drive member mounted for common rotation with said drive shaft and having one or more clutch teeth, a driven member having one or more clutch teeth adapted to be drivingly engaged by said drive member clutch teeth and being mounted for rotation coaxially with said drive member, one of said drive and driven members being mounted for axial movement relative to the other between a released position wherein said drive and driven members are disengaged and a driving position wherein said drive and driven members are in driving engagement to afford transmission of torque therebetween with said clutch teeth co-acting to produce a separating force directed axially in one direction and tending to axially displace said one of said drive and driven members toward said released position, means for drivingly connecting said driven member to said sprocket in response to rotation of said drive shaft, and a resilient element interacting with said one of said drive and driven members and being movable between a first position wherein said resilient element yieldably resists axial displacement of said one of said drive and driven members toward said released position and a second position which is spaced from said first position so as to permit movement of said one of said drive and driven members to said released position, said resilient element moving from said first position to said second position when the axially directed separating force exceeds a predetermined level, said resilient element remaining in said second position in the absence of a reset force applied thereto in the direction opposite from said one direction.

2. A chain saw according to claim 1 wherein said driven member is mounted for axial movement relative to said drive member and said resilient element interacts with said driven member to yieldably resist axial displacement of said driven member toward said released position.

3. A chain saw according to claim 1 wherein said drive member is mounted for axial movement relative to said driven member and said resilient element interacts with said drive member to yieldably resist axial displacement of said drive member toward said release position.

4. A chain saw according to claim 1 wherein said resilient element comprises a Belleville spring including an outer peripheral portion having an inner surface bearing against said one of said drive and driven members.

5. A chain saw according to claim 2 wherein said driven member has a radially extending disc portion axially spaced from said driven member clutch teeth and including an annular protuberance, and wherein said resilient element comprises a Belleville spring including an outer peripheral portion having an inner surface bearing against said annular protuberance.

6. A chain saw according to claim 4 wherein said drive member has a radially extending disc portion which is remotely spaced from said sprocket, has a first face facing said sprocket, and has a second face facing away from said sprocket and including an annular protuberance, wherein said drive member clutch teeth are carried on said disc portion first face, and wherein said resilient element comprises a Belleville spring including an outer peripheral portion having an inner surface bearing against said annular protuberance.

7. A chain saw according to claim 4 wherein said Belleville spring is constructed from steel and the ratio of the free height to the thickness of said Belleville spring is at least 2.85:1.

8. A chain saw according to claim 7 wherein said ratio is about 3:1.

9. A chain saw according to claim 4 and further including a depressible reset means mounted on said frame for axial movement relative to said Belleville spring and having an inner surface adapted to engage the outer surface of said outer peripheral portion of said Belleville spring whereby said Belleville spring can be moved from said second position to said first position and thereby return said one of said drive and driven members from the released position to the driving position by manually applying an axial force on said reset means in said opposite direction.

10. A chain saw according to claim 9 wherein said chain saw frame includes a portion which houses said clutch and which has a recess including an aperture disposed coaxially with said Belleville spring, and wherein said reset means includes a plunger slidably mounted in said recess aperture and having, on the inner end, an annular actuating surface adapted to engage said outer surface of said Belleville spring and a spring for normally urging said plunger actuating surface away from said Belleville spring.

11. A chain saw according to claim 4 wherein said means for drivingly connecting said driven member to said sprocket includes a clutch drum supported for rotation coaxially with and independently of said drive shaft and drivingly connected to said sprocket, a plurality of clutch shoes, means on said clutch shoes and on said driven member for rotatably driving said clutch shoes in response to rotation of said driven member and for guiding said clutch shoes for outward movement radially relative to said driven member in response to rotation of said driven member from a retracted position spaced from said clutch drum to an extended position in driving engagement with said clutch drum.

12. A centrifugal clutch comprising a drive member adapted to be mounted on a driving shaft for common rotation therewith and having one or more clutch teeth, a clutch drum supported for rotation coaxially with and independently of said driving shaft, a driven member having one or more clutch teeth adapted to drivingly engage said drive member clutch teeth and being mounted for rotation coaxially with said drive member, one of said drive and driven members being mounted for axial movement relative to the other between a released position wherein said drive and driven members are disengaged and a driving position wherein said drive and driven members are in driving engagement to afford transmission of torque therebetween with said clutch teeth coacting to produce a separating force directed axially in one direction and tending to axially displace said one of said drive and driven members toward said released position, a plurality of clutch shoes, means on said clutch shoes and on said driven member for rotatably driving said clutch shoes in response to rotation of said driven member and for guiding said clutch shoes for outward movement radially relative to said driven member, in response to rotation of said driven member, from a retracted position spaced from said clutch drum to an extended position in driving engagement with such clutch drum, and a resilient element interacting with said one of said drive and driven members and being movable between a first position wherein said resilient element yieldably resists axial displacement of said one of said drive and driven members toward said release position and a second position which is spaced from said first position so as to permit movement of said one of said drive and driven members to said released position, said resilient element moving from said first position to said second position when the axially directed separating force exceeds a predetermined level, said resilient element remaining in said second position in the absence of a reset force applied thereto in the direction opposite from said one direction.

13. A centrifugal clutch according to claim 12 wherein said resilient element comprises a Belleville spring including an outer peripheral portion having an inner surface bearing against said one of said drive and driven members.

14. A centrifugal clutch according to claim 13 and further including a depressible reset means mounted for axial movement relative to said Belleville spring and having an inner surface adapted to engage the outer surface of said outer peripheral portion of said Belleville spring whereby said Belleville spring can be moved from said second position to said first position and thereby return said one of said drive and driven members from said released position to said driving position by manually applying an axial force on said reset means in said opposite direction.

* * * * *